United States Patent [19]
Evans et al.

[11] 3,837,631
[45] Sept. 24, 1974

[54] SPRING FOR COMPOSITE SEALING RING AND METHOD OF MANUFACTURE

[75] Inventors: Bryce B. Evans, Jackson, Mich.; Edwin C. Elsner, Kanosh, Utah

[73] Assignee: Aeroquip Corporation, Jackson, Mich.

[22] Filed: May 8, 1972

[21] Appl. No.: 251,366

[52] U.S. Cl. ............................................... 267/1.5
[51] Int. Cl. ............................................ F16f 9/36
[58] Field of Search ................................... 267/1.5

[56] References Cited
UNITED STATES PATENTS
| | | | |
|---|---|---|---|
| 3,346,264 | 10/1967 | Hamm | 267/1.5 |
| 3,357,693 | 12/1967 | Perry | 267/1.5 |

*Primary Examiner*—James B. Marbert
*Attorney, Agent, or Firm*—Harness, Dickey & Pierce

[57] ABSTRACT

A spring for a composite sealing ring of the type having a channel-shaped jacket. The spring comprises an annular member of U-shaped cross section, the web of the U engaging the web of the jacket, the flanges of the U pressing against the flanges of the jacket and having a plurality of circumferentially spaced slots. In one form, useful primarily for radial seals, the spring comprises a sinuous member bent to form the web and flanges. In another form, useful for face seals, the web is circumferentially continuous and the flanges are formed by spaced legs. The spring is fabricated by first forming it in flat shape and then bending the flanges out of the plane of the web. The flat blank may be made by a photoetch process or, in the case of the sinuous embodiment, bending a wire into sinuous shape, flattening the wire and then bending the flanges away from the web.

8 Claims, 17 Drawing Figures

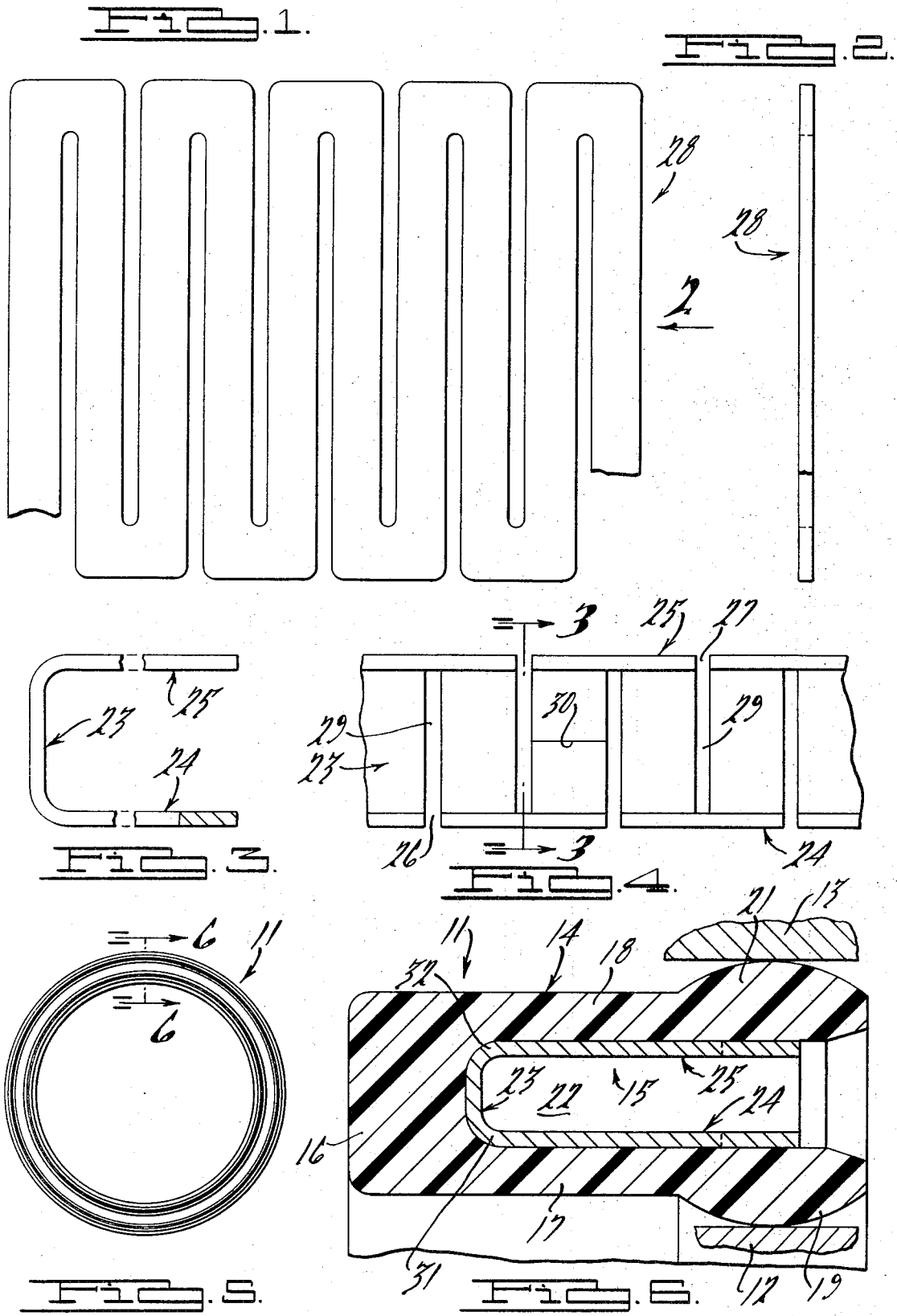

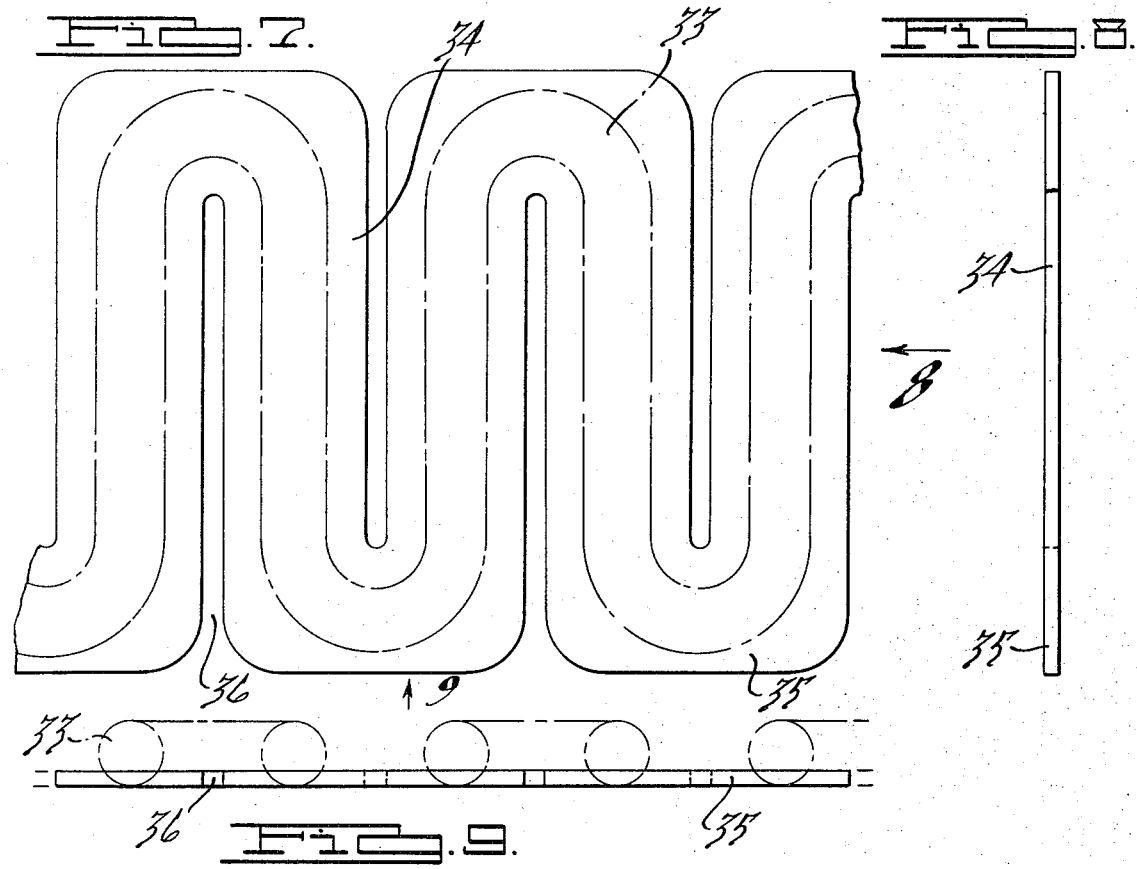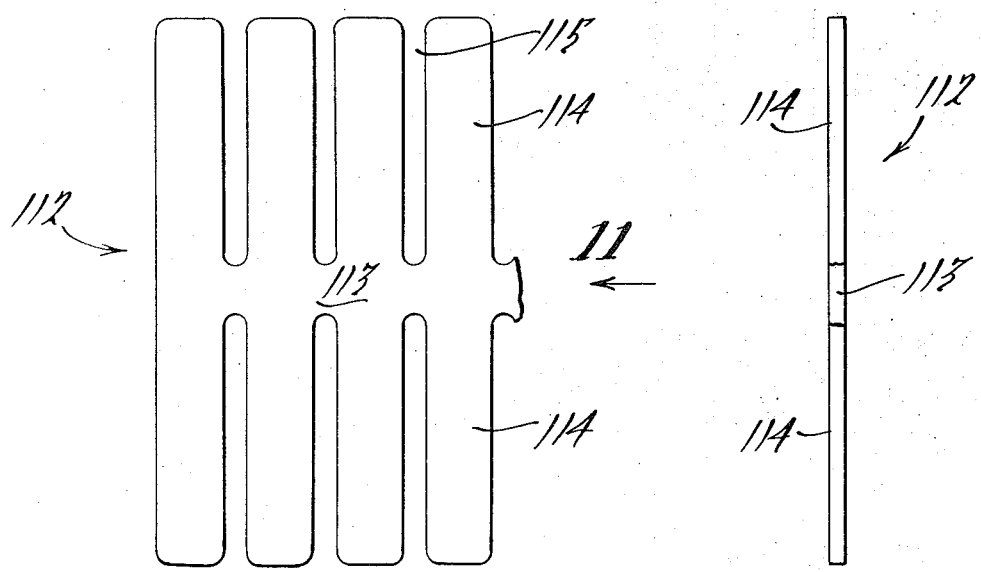

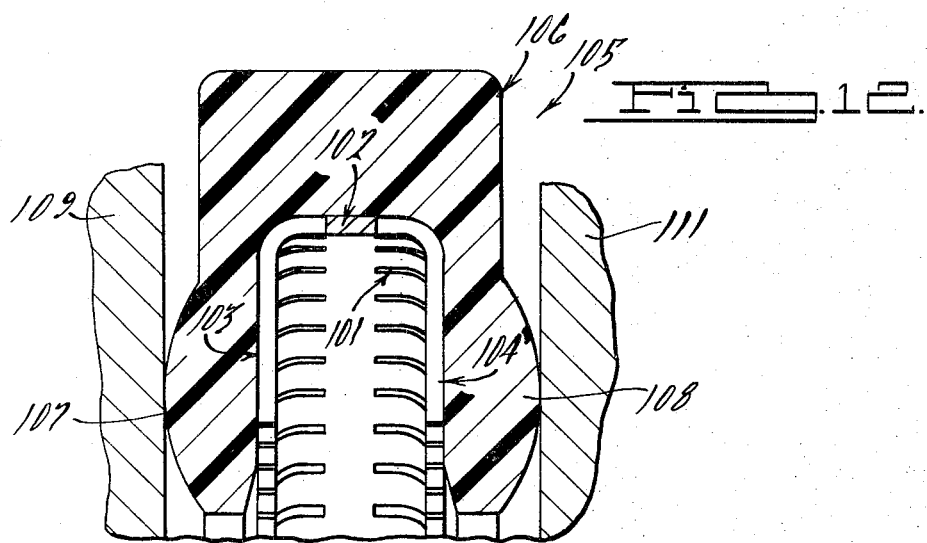
FIG. 12.
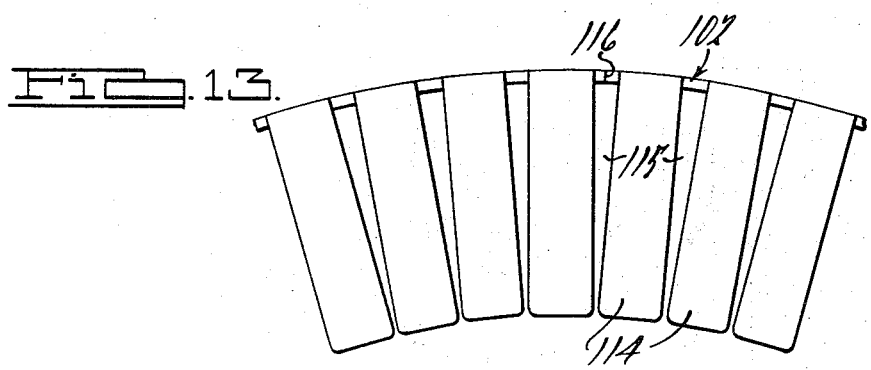
FIG. 13.
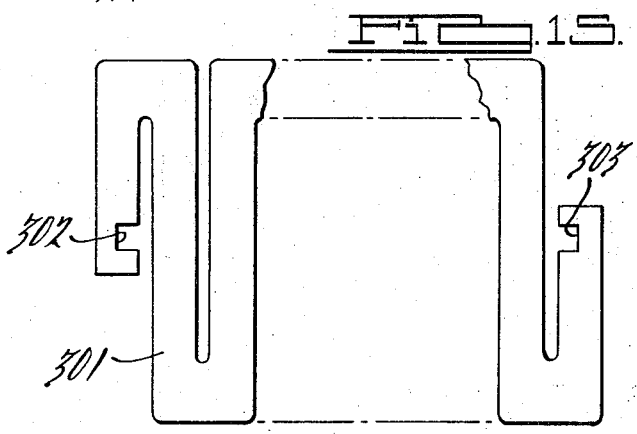
FIG. 15.
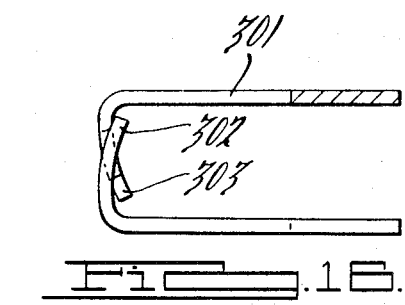
FIG. 14.
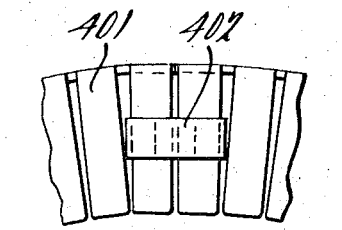
FIG. 17.
FIG. 16.

SPRING FOR COMPOSITE SEALING RING AND METHOD OF MANUFACTURE

BACKGROUND OF THE INVENTION

1. Field of the Invention

The invention relates to seals, and more particularly to composite sealing rings of the type having an annular flexible sealing jacket of channel-shaped cross section the flanges of which engage the surfaces to be sealed, and an annular spring disposed within the jacket and pressing against said jacket flanges. In such sealing rings, the jacket may be made of a material such as Teflon which can perform a sealing function at relatively high temperatures, and the spring is fabricated of a metal which will maintain a constant sealing force over long periods of time.

2. Description of the Prior Art

In prior art sealing rings of this type, as exemplified by Reid U.S. Pat. No 3,223,426, the spring is a helically coiled spring formed of a flat ribbon-like strip of spring material. It has been found that this construction has certain disadvantages, particularly where it is desired to fabricate sealing rings of smaller diameters. In such instances, the helically coiled spring presents too much stiffness and is incapable of sufficient flexing for efficient installation and use. Moreover, in order to form a complete loop with the helically coiled spring, it is necessary to weld the spring ends together which may be a time-consuming and expensive operation.

BRIEF SUMMARY OF THE INVENTION

It is an object of the present invention to provide a novel and improved spring construction for composite sealing rings which provides sufficient flexibility to make it usable in sealing rings of relatively small diameters, without detracting from the efficiency of the spring for its intended purpose.

It is another object to provide an improved spring for composite sealing rings which may be utilized both for radial and face seals, and which eliminates in most cases the need for welding or otherwise attaching the spring ends.

It is also an object to provide an improved spring of the character which is relatively simple and inexpensive to fabricate.

It is another object to provide a method of manufacturing a spring for composite sealing rings which utilizes easily available materials and tools, and is thus economical to practice.

It is a further object to provide an improved spring of this type which is especially adapted for small diameter seals.

It is another object to provide a novel and improved spring of this character which lessens the possibility of the spring in a composite sealing ring popping out of its jacket when being installed in position.

Briefly, the invention comprises an annular spring having a U-shaped cross section, the web of the U resting against the web of the jacket and the flanges pressing outwardly against the flanges of the jacket and having circumferentially spaced slots which allow limited adjustment when installing the spring in the jacket.

In one form, the spring has a sinuous shape so that the web as well as the flanges are provided with slots. This form is especially adapted for use in radial sealing rings. In another version, the web is continuous but the flanges comprise fingers which extend outwardly in opposite directions. This embodiment is particularly adapted for use in face seals.

The spring may be made from a flat blank which is cut to proper length. The flanges are bent out of the plane of the web and the spring then installed in the jacket. In either version, the flat blank may be formed by a photoetch process. The blank for the sinuous form may alternatively be fabricated by bending a wire of round cross section into sinuous shape, flattening the wire and then cutting it to proper length to match the circumference of the jacket.

BRIEF DESCRIPTION OF THE DRAWINGS

FIG. 1 is a fragmentary plan view of the flat blank used to fabricate the sinuous form of the spring;

FIG. 2 is a side elevational view looking in the direction of the arrow 2 of FIG. 1;

FIG. 3 is a cross-sectional view taken along the line 3—3 of FIG. 4 and showing the spring after the flanges have been bent out of the plane of the web;

FIG. 4 is a fragmentary front elevational view of the spring before insertion in the jacket;

FIG. 5 is a front elevational view of a radial composite sealing ring utilizing the spring of this invention;

FIG. 6 is an enlarged fragmentary cross-sectional view taken along the line 6—6 of FIG. 5 and showing the position of the spring in the jacket;

FIG. 7 is a fragmentary plan view in schematic form showing how the sinuous form of the invention may be fabricated using a wire;

FIG. 8 is a side elevational view of the spring of FIG. 7 looking in the direction of the arrow 8 thereof;

FIG. 9 is an end elevational view of FIG. 7 looking in the direction of arrow 9;

FIG. 10 is a fragmentary plan view of the flat blank used to form a second embodiment of the invention, especially useful in face sealing rings;

FIG. 11 is an end elevational view taken in the direction of the arrow 11 of FIG. 10;

FIG. 12 is a fragmentary cross-sectional view in elevation showing the spring of FIGS. 10 and 11 in final form and installed in its jacket;

FIG. 13 is a fragmentary side view in elevation showing the configuration of the fingers; and FIGS. 14, 15, 16 and 17 are fragmentary elevational views, partly in cross section, showing different ways in which the ends of the spring may be attached to each other if necessary.

DESCRIPTION OF THE PREFERRED EMBODIMENTS

A composite sealing ring in which the invention is used is indicated generally at 11 in FIGS. 5 and 6, the illustrated sealing ring being of a radial type to seal between an inner member partially indicated at 12 and an outer member partially indicated at 13. The sealing ring comprises a jacket generally indicated at 14 and a spring generally indicated at 15. The jacket is annular and of channel-shaped cross section, being fabricated of a material such as Teflon which has the desired flexing, sealing, wear and temperature-resistant qualities. This jacket has a central web 16 and inner and outer flanges 17 and 18. Flange 17 has an annular protuberance 19 engaging part 12 and flange 18 carries a similar protuberance 21 engaging part 13. The sealing ring is placed between the parts in such a manner that its open side is exposed to pressure of fluid between the surfaces thereof.

The purpose of spring 15 is to resist deformation of the jacket and exert radial forces on flanges 17 and 18. The spring is of annular shape and fits within the pocket 22 formed by jacket 14. Spring 15 is fabricated of a spring-like material such as stainless steel or any of a number of other materials having appropriate resilient qualities. The spring has a U-shaped cross section with a central web generally indicated at 23 and inner and outer flanges generally indicated at 24 and 25 respectively. Web 23 rests against web 16 of jacket 14 whereas flanges 24 and 25 engage flanges 17 and 18 respectively.

Spring 15 has a sinuous shape as shown in FIGS. 1 through 4, such that spaces 26 appear in flange 24 and spaces 27 in flange 25. These spaces are sufficiently narrow as to prevent the material of jacket 14 from appreciably extruding into the spaces during operation.

Spring 15 is preferably fabricated by first forming a flat blank generally indicated at 28 in FIGS. 1 and 2, and then bending this blank to form the web 23 and flanges 24 and 25 as seen in FIGS. 3 and 4. One method of making flat blank 28 is by the conventional photoetch process. In this method a sheet of spring-like metal is sensitized on one surface and exposed to light of an appropriate pattern. The sheet is then dipped in acid which will etch away certain portions of the metal, leaving the flat blank shown in FIGS. 1 and 2. The photoetch process is especially useful where springs for relatively small diameter sealing rings are being manufactured. Blank 28 is cut to a length corresponding to the circumference of the jacket slot 22 and is then bent to the form shown in FIGS. 3 and 4 so that web 23 will approximate the inside surface shape of jacket web 16 and flanges 24 and 25 will lie flat against flanges 17 and 18 respectively when the seal is mounted in position. Alternatively, the spring length could be determined after the flanges are bent from the web. In most cases, the ends of the spring merely abut each other after insertion in the slot, although other methods of fastening the ends are discussed below.

It will be seen from the figures that flanges 24 and 25 are each made up of a plurality of U-shaped legs forming the spaces 26 and 27 therebetween, and that web 23 likewise has spaces 29. These spaces will facilitate insertion and curving of the spring around groove 22, it being preferred that the neutral axis of bending be approximately equal to the circumferential length of the groove so that spaces 26 will slightly contract and spaces 27 slightly expand during formation of the spring. The thickness and dimensions of the spring material may, of course, be varied to suit the particular force and other requirements. The abutment between the spring ends is indicated at 30 in FIG. 4.

The operation of spring 15 will be apparent from FIG. 6. Flexing of the spring will occur mainly along web 23 and the junctions 31 and 32 between this web and flanges 24 and 25 respectively. Thus, while adequate forces will be constantly exerted on portions 19 and 21 of jacket 14 to create the sealing action, there will be sufficient flexibility in the entire assembly to permit insertion between the parts. This will be especially useful when relatively small diameters are involved, since it has been found that the conventional helically coiled spring in the aforementioned U.S. Pat. No. 3,223,426 is frequently too stiff to permit proper installation.

FIGS. 7, 8 and 9 illustrate another method of manufacturing a flat blank for the spring shown in FIGS. 5 and 6. According to this method, a soft work-hardenable grade of round wire indicated in dot-dash lines at 33 is formed into sinuous shape with relatively long parallel legs connected by short arcuate portions. It is then flattened to the thickness and shape shown in solid lines in FIGS. 8 and 9. This will leave legs 34 connected by bridges 35, with spaces 36. The initial diameter of the wire, its pitch during the sinuous bending, and the thickness to which it is flattened are all controlled so that the resulting growth after flattening will close gaps 36 to the desired dimensions. Moreover, during the flattening process the soft wire will work to spring hardness eliminating the requirement for heat treatment. The material grain structure will also follow the original axis of the wire which is ideal for the spring as it is used.

FIGS. 10 through 13 illustrate a second embodiment of the invention which is basically similar to the first embodiment but in which the web portion of the spring is continuous. As seen in FIG. 12, the spring is generally indicated at 101 and is of annular construction with a U-shaped cross section, having a web generally indicated at 102 and a pair of flanges generally indicated at 103 and 104. For reasons which will become apparent, this embodiment of the spring is especially adapted for composite sealing rings which are used as face rather than radial seals. Such a ring is generally indicated at 105 in FIG. 12 and comprises a jacket generally indicated at 106 having ridges 107 and 108 engaging parts 109 and 111 respectively.

Spring 101 is formed from a flat blank generally indicated at 112 in FIGS. 10 and 11. This blank, which may be fabricated by the above-described photoetch process, comprises a continuous central portion 113 and a plurality of outwardly extending fingers 114 with spaces 115 therebetween. Fingers 114 are bent so as to form flanges 103 and 104, and the blank cut to the desired length matching the circumference of the jacket slot.

To install spring 101, one end will be inserted in the slot and the remainder of the spring progressively inserted. The ends will abut as indicated at 116 in FIG. 13. Welding or otherwise attaching the spring ends will normally be unnecessary because web 102 is supported by the jacket web and will thus not change its curvature. Flanges 103 and 104 will constantly urge portions 107 and 108 of the jacket against their respective parts 109 and 111.

FIG. 13 illustrates the shape of flanges 103 and 104 when the spring is installed. It will be noted that spaces 115 between the fingers 114 will be narrowed as web 102 flexes to engage the web of jacket 106.

FIGS. 14, 15, 16 and 17 show various ways in which the ends of a spring may be secured if this becomes necessary in any particular installation. FIG. 14 shows a spring 201 with its abutting ends welded as indicated at 202. FIGS. 15 and 16 show a spring 301 having a notch and dovetail connection 302, 303. FIG. 17 shows a spring 401 in which the abutting ends are stapled as indicated at 402.

We claim:

1. A spring for a composite sealing ring of the type having an annular flexible sealing jacket of channel-shaped cross section with a web and a pair of flanges engaging the parts to be sealed, said spring comprising an annular member of U-shaped cross section having a flat web engaging the web of said jacket and a pair of flat flanges engaging and pressing outwardly on the flanges of said jacket, said web being as wide as and conforming to the shape of the bottom of said jacket channel, whereby the flange portions adjacent said web will be at least as far apart as their portions remote from said web when the ring is installed in said channel, said flanges having circumferentially spaced slots and engaging the walls of said jacket channel from their portions adjacent to their portions remote from the channel bottom, said spaces being substantially narrower than the portions of said spring between said spaces so as to prevent said jacket from appreciably extruding into said spaces during operation.

2. A spring for a composite sealing ring of the type having an annular flexible sealing jacket of channel-shaped cross section with a web and a pair of flanges engaging the parts to be sealed, said spring comprising an annular member of U-shaped cross section having a web engaging the web of said jacket and a pair of flanges engaging and pressing outwardly on the flanges of said jacket, said flanges having circumferentially spaced slots, said spring being fabricated of a flat member which extends sinuously through both flanges and the web, whereby said slots will extend from alternate flanges through said web, each slot extending completely through one flange and said web and partially through the other flange, the slots being substantially narrower than said web and flanges and sufficiently narrow as to prevent appreciable extrusion of the jacket material into the slots during use.

3. The combination according to claim 2, the ends of said spring being in abutting relation.

4. The combination according to claim 2, the ends of said spring being in abutting relation and welded together.

5. The combination according to claim 2, the ends of said spring being in abutting relation and having a slot and dovetail connection.

6. The combination according to claim 2, the ends of said spring being in abutting relation and stapled together.

7. The combination according to claim 1, said spring being fabricated from a flat blank having a continuous central portion and oppositely extending fingers with said slots therebetween, said fingers being bent to form the flanges with the continuous portion forming the web.

8. The combination according to claim 7, the ends of said spring being in abutting relation.

* * * * *